United States Patent Office 3,632,688
Patented Jan. 4, 1972

3,632,688
PROCESS OF REINFORCEMENT OF
POLYVINYL CHLORIDE
Jean LeGros, Montmorency, and Michel Juillard, Orsay, France, assignors to Produits Chimiques Pechiney-Saint-Gobain, Neuilly-sur-Seine, France
Filed Aug. 23, 1968, Ser. No. 754,894
Claims priority, application France, Aug. 29, 1967, 119,291
Int. Cl. C08f 29/24
U.S. Cl. 260—899
2 Claims

ABSTRACT OF THE DISCLOSURE

Resins having a polyvinyl chloride base reinforced with up to 5% by weight of a propylene oxide polymer, preferably having a high viscosity and of a rubbery type.

---

This invention relates to a process for improvement, and especially reinforcement of plastic or resinous materials having a base of polyvinyl chloride and to resinous compositions prepared thereby and products prepared thereof.

It is known to incorporate additives, such as calcium carbonate, silicates and metal oxides into polymers and copolymers of vinyl chloride for the purpose of lowering the cost and/or to impart improved qualities to the products formed thereof. In general, however, such additions impair the mechanical properties of the plastic material, especially from the standpoint of traction resistance and elongation.

The addition of alumina of particular characteristics had been recommended for purposes of reinforcement but the results obtained present a rate of ashing which may be too high.

Organic materials have been suggested for reinforcement, such as the copolymers of the acrylonitrile-butadienestyrene group, certain types of rubbers, copolymers of vinyl acetate and ethylene, or chlorinated polyethylene. All of these materials are expensive. Furthermore, in order to obtain noticeable improvement, one must add considerably quantities of such materials.

We have discovered an advantageous process for reinforcement of materials based upon polymers or copolymers of vinyl chloride and it is an object of this invention to provide a method and means for achieving same.

Figure 1:
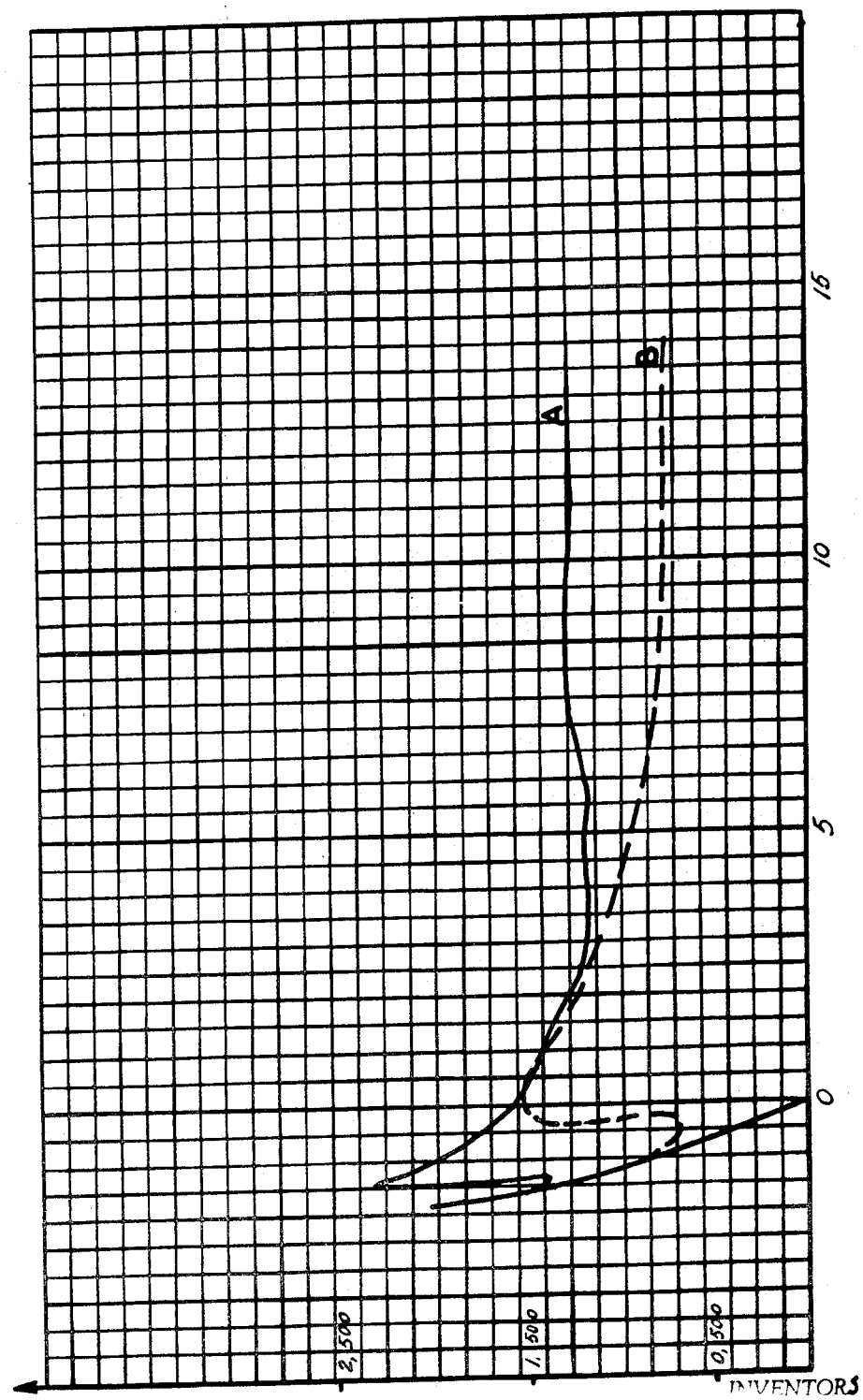
Figure 2:
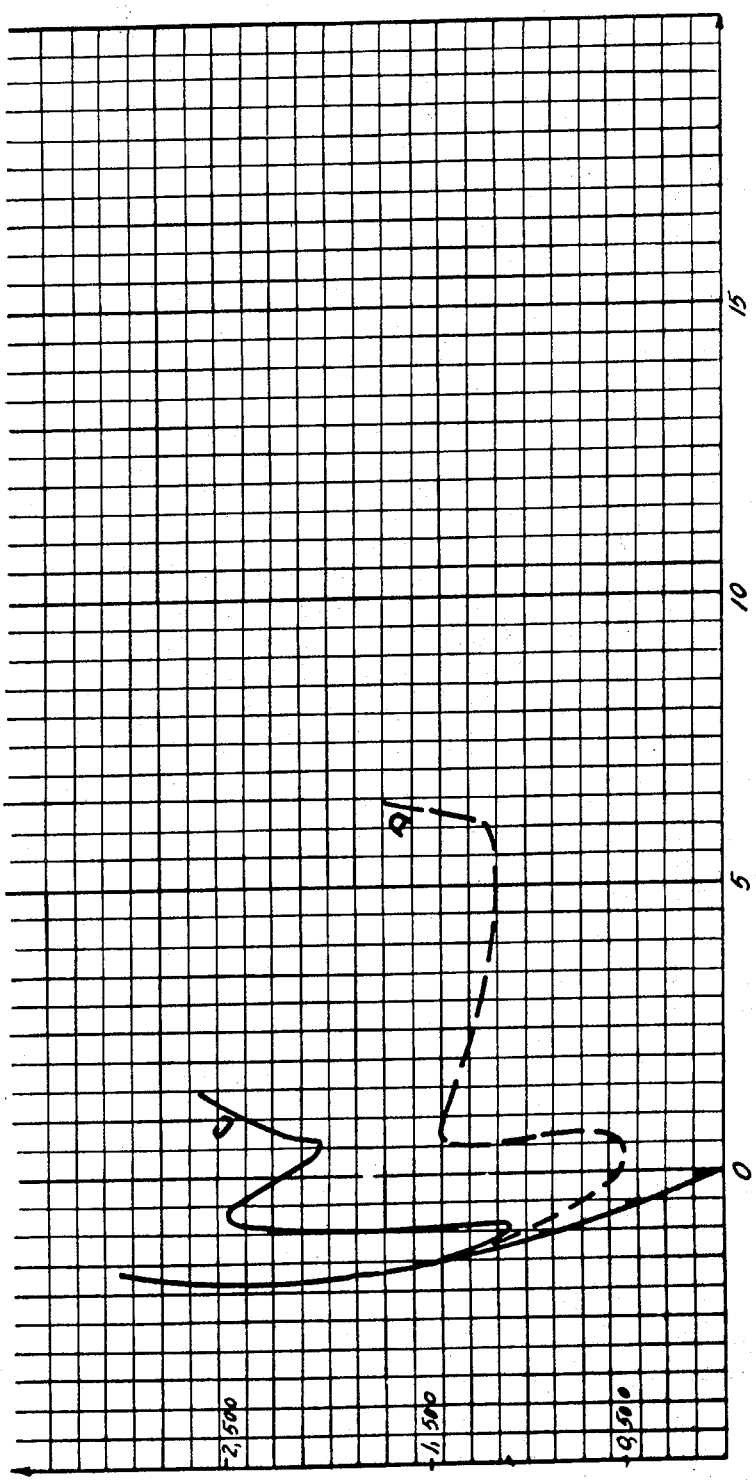

FIGS. 1 and 2 are Brabender curves of polyvinyl chloride resins reinforced with polyepoxypropane.

In accordance with the practice of this invention, one adds from 1 to 10 percent by weight, based upon the polymer or copolymer of vinyl chloride, of a rubbery polymer derived from propylene oxide having a high viscosity index limit.

A preferred practice of this invention resides in the addition to the plastic material of the polyvinyl chloride type of 0.1 to 10 percent by weight of a rubbery polymer derived from propylene oxide having a viscosity index limit above 300 ml.g$^{-1}$.

The viscosity index limit, or intrinsic viscosity, is the value defined by the index of viscosity in relation to the specific viscosity of the concentration, at the stage when the concentration of the polymer within the solvent which is employed leans towards zero. The index of viscosity is determined in accordance with the procedure NF—T51013, at 100° C., with alpha-chloronaphthalene as solvent.

The plastic materials, based on polymers or copolymers of vinyl chloride, which are suitable for use in the practice of this invention, include the homopolymers of vinyl chloride including the chlorinated polyvinyl chloride, the copolymers of vinyl chloride, whereby the homo- and copolymers have undergone all of the customary improvement treatments so that the above enumeration is by no means exclusive.

The following examples are given by way of illustration, but not by way of limitation, of the practice of this invention with thermoplastic resins of the vinyl type sold under the following trade names: LUCOVYL RBC8067, LUCOVYL RB8010, LUCOVYL H4010. These products have the following characteristics:

LUCOVYL RBC8067:
Chlorinated polyvinyl chloride
Appearance: very small granules of rounded shape.
Granulometry: 0% retained on a sieve having a mesh of 250 microns. 90–98% retained on a sieve having a mesh of 100 microns.
Apparent volume mass: 0.58 to 0.62 g./cm.$^3$.

LUCOVYL RB8010:
Polymer of vinyl chloride prepared by mass polymerization.
Appearance: very small granules of rounded form having a high porosity.
Granulometry: (very regular): 0% retained on a sieve having a mesh of 250 microns. 90–98% retained on a sieve having a mesh of 100 microns.
Apparent volume mass: (grams per cubic centimeter): 0.58 to 0.62.
Viscosity index: 75 to 80
K-value (Wert) (cyclohexanone): 55 to 57

LUCOVYL H4010:
Copolymer of vinyl chloride
Reinforcement agent for polyvinyl chloride
Appearance: White powder.
Apparent volume mass: 0.35 to 0.40 g./cm.$^3$
Granulometry: 85–90% retained on a sieve having a mesh of 200 microns.
Humidity: 0.5%
Volatiles: 0.4%

The tests indicated by the following examples purport to show the action of the polymers of propylene oxide as a reinforcing agent and stress agent for resins based upon polyvinyl chloride. For this purpose, stress measurements were made on the Brabender plastograph and resistance measurements were made by the Charpy striking pendulum.

The plastograph Brabender (see P. Schmidt Kunststoffe, vol. 42, May 1952, pages 142–148) is an instrument which enables determination of the aptitude to gelation and the stability of the polyvinyl chloride. The instrument makes it possible to register, as a function of time, the stress torque which is necessary to break down a given mass quantity of polyvinyl chloride at a given temperature and under a given speed of rotation of the mixing arms.

For the Charpy test, units of polyvinyl chloride are made in the following manner:

First one prepares sheets drawn from the material in the mixer having a thickness of 1.5 mm. Six sheets are stacked in the direction of pull and plates are made therefrom. From these plates, test units are cut out in pieces of 150 x 12.5 x 4 mm. In these test pieces, midway of the longer dimension, one notches a round hole of 0.5 mm. diameter, which is connected to the edge by a saw cut. The outside of the diameter of the hole parallel to the short side of the test piece is at a distance of 2 to 10 mm. from the long side of the test piece, the latter being cut in at one-fifth of its width.

On these test pieces, resistance tests are made in accordance with the method of the striking pendulum Charpy, at 20° C., using a ram of 150 kg. The distance between the supports on which the test piece rests measures 100 mm. and the energy of the pendulum is 150 kg./cm. The results are expressed in kg./cm.$^2$, with relation to the section of the test piece which is notched at the bottom.

Following are examples of the operation of the invention. In these examples, the parts and percentages refer to weight, unless otherwise indicated.

EXAMPLE 1

One prepares on the mixer, with the cylinders heated to 130° C., a product of the following composition:

|  | Parts |
|---|---|
| LUCOVYL RB8010 | 98 |
| Polyepoxypropane | 2 |
| Dibasic stearate of lead | 2 |

Moldings are prepared at temperatures of 145° and 155° C. The results of the measurements for shock resistance are as follows:

LUCOVYL RB8010 (test mass—molded at 145° C.: 6 kg./cm.$^2$.

Mixture:
  Molded at 145° C.: 14.2 kg./cm.$^2$
  Molded at 155° C.: 12.5 kg./cm.$^2$

EXAMPLE 2

In an internal mixer having a body temperature of 120° C., polyepoxypropane in variable amounts is incorporated into LUCOVYL RB8010. From the mixture obtained, test pieces are prepared as described above and submitted to impact tests, the results of which are listed in Test Nos. 1 to 7.

The results are set forth in the following Table I. For purposes of comparison, the results are given for the same stress conditions for use as a reinforcing agent of either a copolymer of vinyl chloride (LUCOVYL H4010) (Tests 8 to 16), or, alternatively, an alumina (Tests 17 to 19).

TABLE I

| Test No. | Resin of polyvinyl chloride LUCOVYL RB8010, quantity/parts | Reinforcement agent Nature | Quantity/parts | T° (temp.) of the molding | Impact strength, kg./cm.$^2$ |
|---|---|---|---|---|---|
| 1 | 98 | Polyepoxypropane | 2 | 145 | 6.1 |
| 2 | 98 |  | 2 | 155 | 8.9 |
| 3 | 98 |  | 2 | 165 | 8.5 |
| 4 | 95 |  | 5 | 145 | 8.0 |
| 5 | 95 |  | 5 | 155 | 11.9 |
| 6 | 95 |  | 5 | 165 | 18.0 |
| 7 | 90 |  | 10 | (*) | (*) |
| 8 | 98 | LUCOVYL H4010 | 2 | 145 | 4.3 |
| 9 | 98 |  | 2 | 155 | 6.6 |
| 10 | 98 |  | 2 | 165 | 7.3 |
| 11 | 95 |  | 5 | 145 | 5.3 |
| 12 | 95 |  | 5 | 155 | 9.0 |
| 13 | 95 |  | 5 | 165 | 9.7 |
| 14 | 90 |  | 10 | 145 | 9.1 |
| 15 | 90 |  | 10 | 155 | 14.4 |
| 16 | 90 |  | 10 | 165 | 15.7 |
| 17 | 95 | Alumina | 5 | 145 | 10.4 |
| 18 | 95 |  | 5 | 155 | 9.7 |
| 19 | 95 |  | 5 | 165 | 7.6 |

*A mixture which cannot be worked.

EXAMPLE 3

The purpose of this test is to show the thermal effect upon the dimensional stability when polyepoxypropane is added to polyvinyl chloride. For such demonstration, the Vicat Grade or point is determined.

The test is made on the resin LUCOVYL RB8010 and upon a mixture thereof with 5% polyepoxypropane with the following results:

LUCOVYL RB8010 _____ Vicat 81.5° C.
With addition of 5% polyepoxypropane __ Vicat 79.5° C.

EXAMPLE 4

As the preceding experiments have shown, the maximum percentage that can be incorporated of the propylene oxide derivation is about 5%. Measurements on the Brabender Plastograph have been made on a mixture containing 3% polyepoxypropane.

Mixture A: Parts
  LUCOVYL RB8010 _____ 100
  Dibasic stearate of lead _____ 2
Mixture B:
  LUCOVYL RB8010 _____ 97
  Polyepoxypropane _____ 3
  Dibasic stearate of lead _____ 2

The test was carried out under the following conditions:

Temperature of the vessel _____ °C__ 180
Rotation speed _____ r.p.m.__ 90/60
Quantity of the mass _____ g__ 30

FIG. 1 of the drawings shows the Brabender curves for both mixtures A and B. The characteristics of the curves of the two mixtures are as follows:

| Mixture | Torque per step of powder, mkg. | Gel time, min. | Torque at the peak of gelation, mkg. | Torque per step of stability |
|---|---|---|---|---|
| A | 1.400 | 0.30 | 2.300 | 1.300 |
| B | 0.700 | 1.45 | 1.550 | 0.775 |

It will be observed that the polyepoxypropane exerts, on the one hand, a reinforcing action and, on the other hand, a lubricating action; first in the powder stage as indicated by the gel time and reduction of the torque upon the level of powder and then in the gelled stage as evidenced by a reduction in the level of stability with a steadying of the curve.

EXAMPLE 5

In order to determine the influence of polyepoxypropane upon the stress to which chlorinated polyvinyl resin can be subjected, tests were made with a resin LUCOVYL RBC8067.

Mixture C: Parts
  LUCOVYL RBC8067 _____ 100
  Dibasic stearate of lead _____ 2
Mixture D:
  LUCOVYL RBC8067 _____ 97
  Polyepoxypropane _____ 3
  Dibasic stearate of lead _____ 2

The Brabender curve is shown in FIG. 2.

The advantages of the process of this invention may be listed as follows:

substantial reinforcement is obtained upon addition of a small, negligible quantity of polyepoxypropane (up to 5% by weight);
good fluidity of the mixtures;
lubricating action;
absence of mineral products.

The process of this invention provides interesting results which may adapt the material to injection techniques, extrusion, extrusion and blowing, and calendering. Thus, the products of this invention can be utilized in the manufacture of products which are produced by any of the named processing techniques.

It will be understood that modifications may be made in the formulation and operation without departing from the spirit of the invention, especially as defined in the following claims.

We claim:

1. In a process for the reinforcement and improvement of polyvinyl chloride resins, the improvement comprising adding from 1–10% by weight of a rubbery propylene oxide homopolymer having a viscosity index limit in excess of 300 ml.g$^{-1}$.

2. A composition consisting essentially of a polymer selected from the group consisting of polyvinyl chloride and chlorinated polyvinyl chloride reinforced with up to 5% by weight of the rubbery homopolymer of propylene oxide having a viscosity index limit in excess of 300 ml.g$^{-1}$.

References Cited

FOREIGN PATENTS 887,353   1/1962   Great Britain _____ 260—33.2

MURRAY TILLMAN, Primary Examiner

C. J. SECCURO, Assistant Examiner

U.S. Cl. X.R.

260—23 EP; 23 XA, 41 B

UNITED STATES PATENT OFFICE
CERTIFICATE OF CORRECTION

Patent No. 3,632,688     Dated January 4, 1972

Inventor(s) Jean Legros et al.

It is certified that error appears in the above-identified patent and that said Letters Patent are hereby corrected as shown below:

column 3, Table I, under Test No. 16, last column, change "15.7" to "15.9;

column 3, Table I, under Test No. 18, last column, change "9.7" to "9.4"

Signed and sealed this 19th day of September 1972.

(SEAL)
Attest:

EDWARD M. FLETCHER, JR.       ROBERT GOTTSCHALK
Attesting Officer      Commissioner of Patents